April 4, 1961 H. J. HOOVER 2,977,738
WORK VEHICLE FOR CLEANING DRAINAGE CANALS
Filed Sept. 4, 1959 4 Sheets-Sheet 1
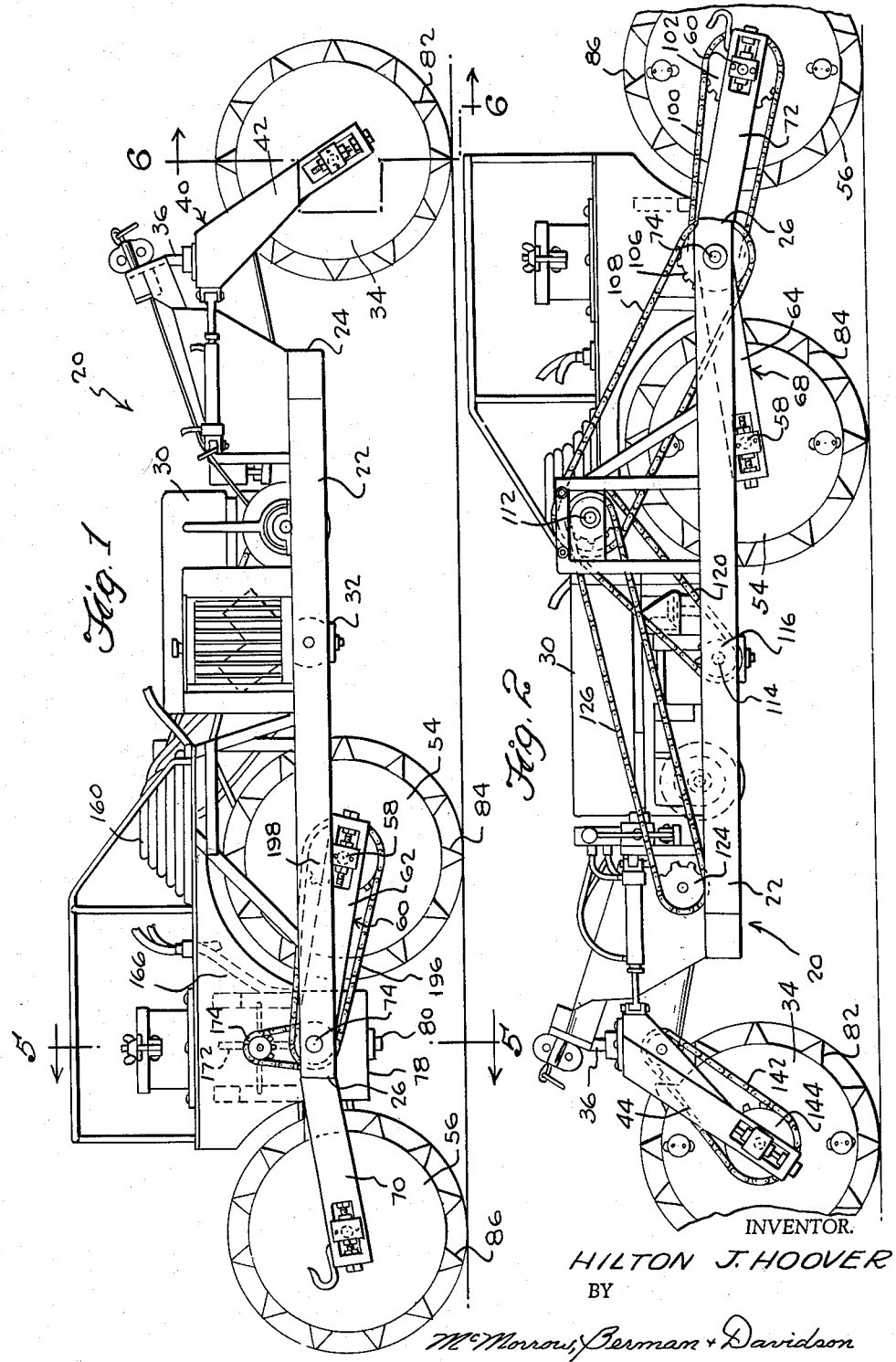
INVENTOR.
HILTON J. HOOVER
BY
McMorrow, Berman & Davidson
ATTORNEYS

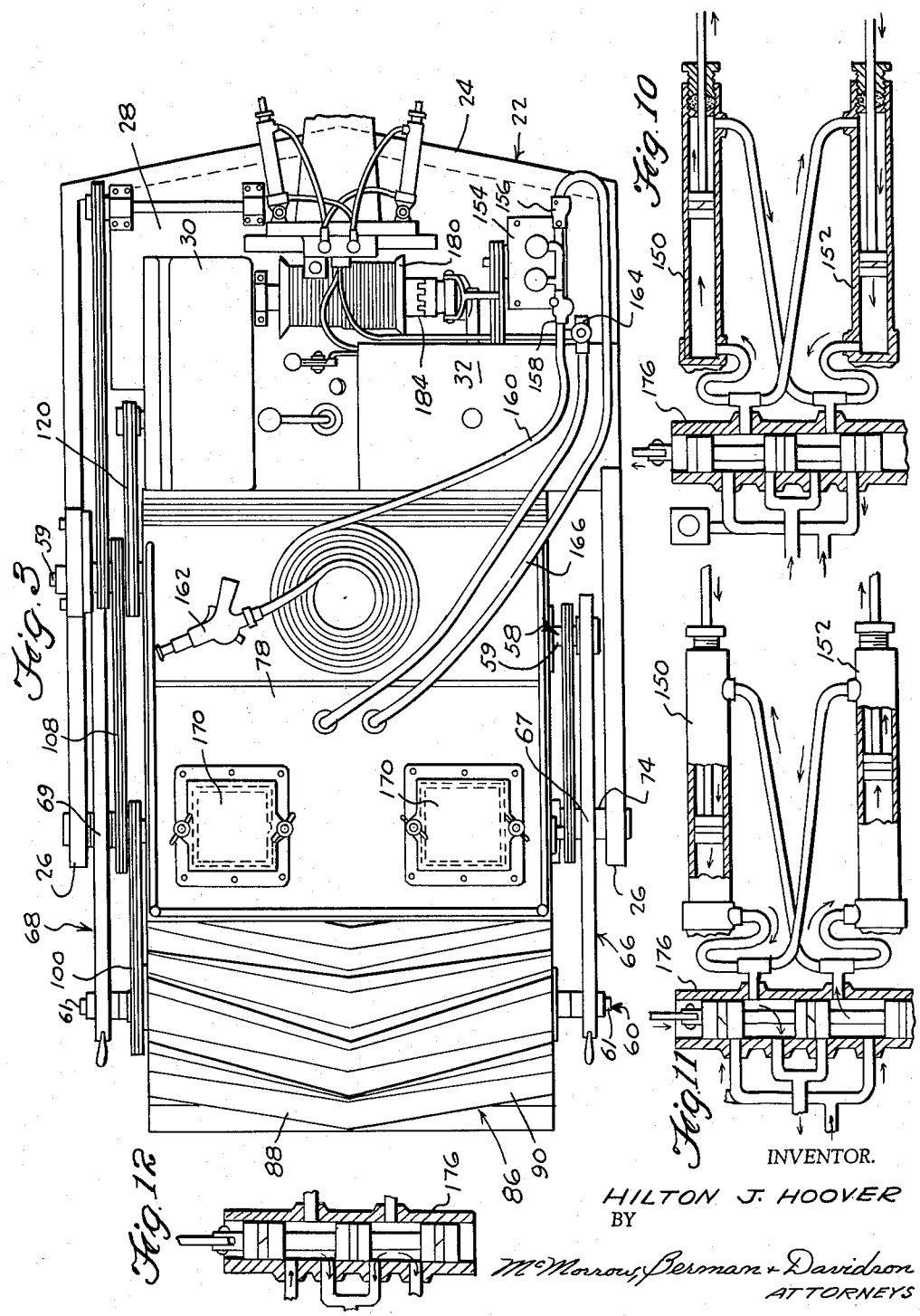

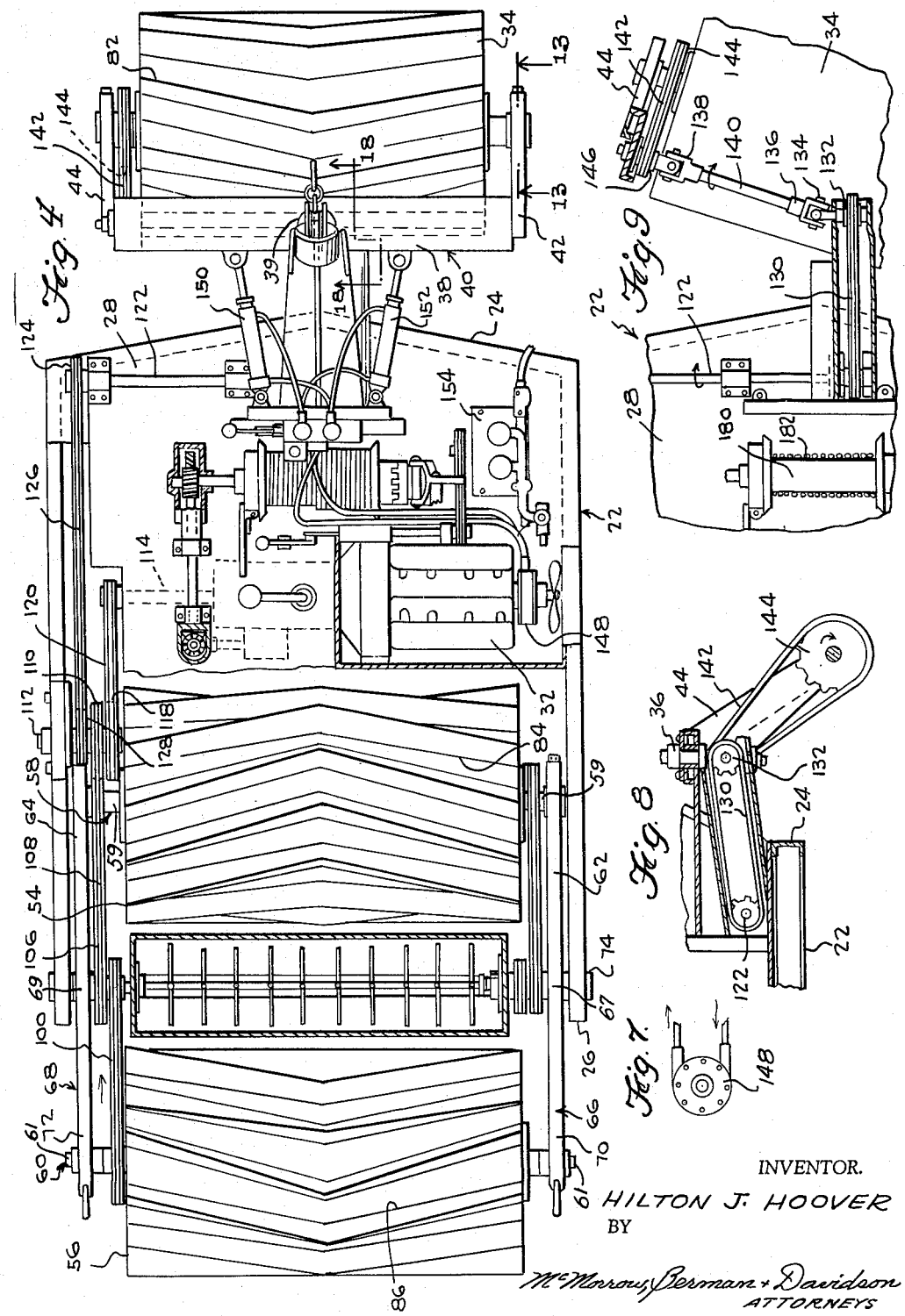

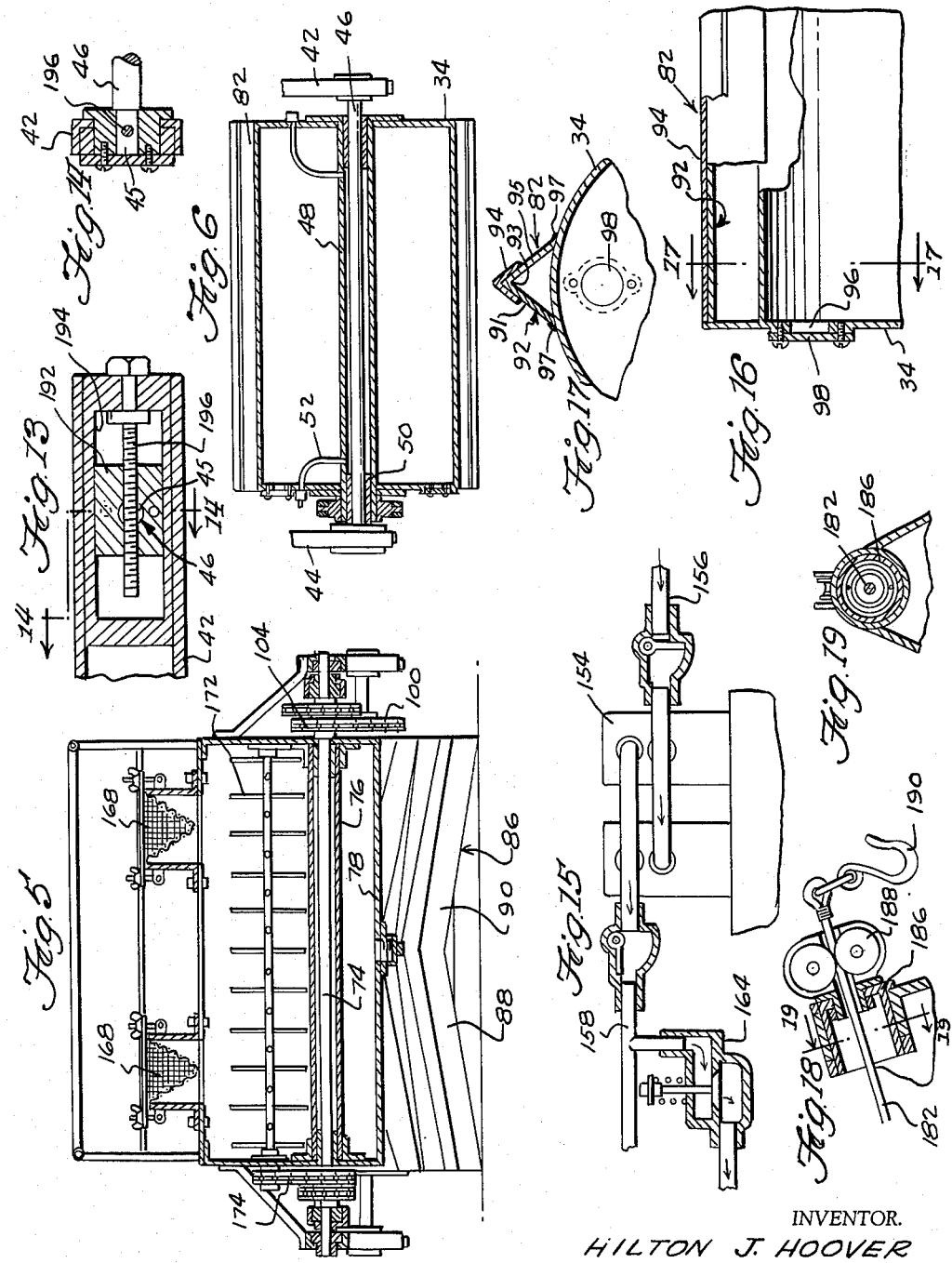

United States Patent Office 2,977,738
Patented Apr. 4, 1961

2,977,738
WORK VEHICLE FOR CLEANING DRAINAGE CANALS
Hilton J. Hoover, 636 SE. Railroad Ave., Ponchatoula, La.
Filed Sept. 4, 1959, Ser. No. 838,345
5 Claims. (Cl. 56—8)

The present invention relates to a work vehicle for cleaning vegetation from drainage canals.

Previously proposed and presently in use are work vehicles and implements for cleaning vegetation from drainage canals. Such vehicles or implements that have been proposed or are in use have not met with general acceptance for many reasons. Principally, in areas of swamps, land vehicles adapted for travel along the banks of a canal while cleaning the same of vegetation are unable to traverse swampy land in order to travel from one canal to another canal. Vehicles designed for travel on the surface of a body of water are not always successful for the reason that frequently a drainage canal clogged with vegetation has little or no water therein. Other vehicles have been proposed for travel on the land and on the water and such amphibious vehicles have not been wholly successful for the reason that such vehicles generally are cumbersome and unwieldy and are unable to travel successfully on a road surface when not engaged in the operation of cleaning a drainage canal of vegetation.

An object of the present invention is to provide a work vehicle for cleaning vegetation from drainage canals which lends itself to efficient operation, one which may travel on the bottom of a canal with ease and at a speed so as to rapidly clear the canal of vegetation, one which may travel on a road surface, and one which may be driven from a road surface to the bottom of a canal and from the bottom of a canal to a road surface with ease and facility.

Another object of the present invention is to provide a work vehicle for clearing vegetation from a drainage canal which is self-sufficient in operation, one having means for storing a supply of chemical for killing vegetation in a canal, one having a means for spreading such chemical when in a water solution over a large area of land on each side of the canal or in an adjoining canal, and one having means for crushing and destroying vegetation in the bottom of the canal while spraying land on either side of the canal with a chemical mixture for killing the vegetation thereon.

These and other objects of the present invention will be fully apparent from the following description when taken in conjunction with the annexed drawings, in which:

Figure 1 is a side elevational view of the work vehicle of the present invention, Figure 2 is a side elevational view with portions of the front and rear rollers broken away, and as viewed from the side opposite to Figure 1, Figure 3 is a plan view with the front roller broken away, Figure 4 is a plan view with the top of the tank, seat, and engine cover removed, Figure 5 is a view taken on the line 5—5 of Figure 1, Figure 6 is a view taken on the line 6—6 of Figure 1, Figure 7 is an elevational view of the hydraulic fluid pump removed from the engine, Figure 8 is a fragmentary elevational view, with parts broken away, showing the drive means for the front rollers, Figure 9 is a fragmentary plan view, with parts broken away, of the assembly shown in Figure 8, Figure 10 is a schematic enlarged view of the hydraulic apparatus employed for steering the front roller, showing the apparatus in condition for making a right turn, Figure 11 is another schematic enlarged view of the hydraulic steering apparatus, showing the apparatus in condition for a left turn, Figure 12 is a schematic enlarged view of the steering control valve showing it in neutral condition, Figure 13 is a vertical enlarged view taken on the line 13—13 of Figure 4.

Figure 14 is a view taken on the line 14—14 of Figure 13,

Figure 15 is a diagrammatic enlarged view of the connection of the pump to the nozzle and pressure relief valve, Figure 16 is a fragmentary enlarged view showing the construction of one of the rollers, Figure 17 is a view taken on the line 17—17 of Figure 16, Figure 18 is a view, on an enlarged scale, taken on the line 18—18 of Figure 4, and Figure 19 is a view taken on the line 19—19 of Figure 18.

Referring in greater detail to the drawings in which like numerals indicate like parts throughout the several views, the work vehicle of the present invention is designated generally by the reference numeral 20 and it includes a horizontally disposed frame 22 having a forward end 24 and a rearward end 26. The frame 22 is U-shaped and is disposed with its bight forwardly, as shown most clearly in Figure 3. The frame 22 supports a platform 28 (Figure 3) on which is mounted a seat 30 and an engine 32.

A steerable first ground-engaging roller 34 is positioned transversely of the frame 22 adjacent the forward end 24 and is in supporting relation with respect to the frame 22 and connected to the frame 22 for pivotal movement about a kingpin 36 as a vertical axis. The kingpin 36 projects upwardly from the mid part 39 of the bight 38 of a U-shaped frame 40 having legs 42 and 44 extending downwardly and forwardly from the bight 38.

A fixed axle 46 extends between the lower ends of the legs 42 and 44 (Figure 6) and carries thereon a rotatable sleeve 48 on which is fixedly secured the roller 34. Bearings 50 within each end of the sleeve 48 support the sleeve 48 on the axle 46 and a suitable conduit 52 is provided for introducing a lubricant into the interior of the sleeve 48 between the bearings 50.

Second and third rollers 54 and 56, respectively, are arranged in tandem spaced relation and are positioned transversely of the frame 22 adjacent the rearward end 26. The rollers 54 and 56 are in supporting relation with respect to the rearward end 26 of the frame 22 and are mounted upon fixed shafts 58 and 60, respectively. The end portions 59 of the shaft 58 are secured in the free ends of legs 62 and 64 of inverted V-shaped members 66 and 68, and the end portions 61 of the shaft 60 are secured in the free ends of the other legs 70 and 72 of the inverted V-shaped members 66 and 68. A drive shaft 74 extends through the apexes of the members 66 and 68 and the apexes 67 and 69 of the members 66 and 68, respectively are mounted for rocking movement about the drive shaft 74 as a horizontal axis in the rearward end 26 of the frame 22.

In Figure 5, the drive shaft 74 is seen extending through a sleeve 76 which extends transversely through a tank 78 carried on the frame 22. The bottom of the tank 78 extends below the drive shaft 74 and is provided with a drain plug 80, as shown most clearly in Figure 1.

The first roller 34, second roller 54 and third roller 56, are each provided with a plurality of continuously perpendicularly projecting cleats 82, 84 and 86, respectively, extending in transverse spaced relation across the exterior surface of the respective rollers 34, 54, and 56, from one end of such roller to the other end. The cleats 82 and 86 of the rollers 34 and 56 run in the same direction and the cleats 84 of the roller 54 run in the opposite direction.

The cleats of the rollers 34, 54 and 56, are identical in construction and are shown most clearly with reference to the cleats 86 of the roller 56 in Figures 3 and 5. The cleats 86 each embody a pair of legs 88 and 90 arranged in diverging relation with the convergent ends of such legs 88 and 90 merging into an apex lying along a circle circumscribed about the central point of the roller 56. The cleats 84 and 82 of the rollers 56 and 34 are similarly arranged with legs disposed in the same manner as described with reference to the cleats 86 of the roller 56 and the apexes of the legs arranged so as to lie along circles circumscribed about the central points of the rollers 54 and 34. The apex of each cleat 84 on the roller 54 faces in the opposite direction from the apexes of the cleats 84 and 86.

In Figures 16 and 17 one of the rollers is shown, roller 34 for instance, with one cleat 82 thereof. The cleat 82 consists in an angular member 92 having its apex 93 capped with a reinforcing shoe 94. The legs 91 and 95 of the member 92 are welded as at 97 to the periphery of the roller 34 and the shoe 94 is welded to the apex portion of the member 92. The roller 34 is seen to have a filler opening 96 closed by a closure member 98 with suitable gasket material interposed therebetween.

An important feature of the present invention resides in the fact that the cleats 86 on the roller 56 are arranged relative to the cleats 82 on the roller 34 so that each cleat 86 of the roller 56 engages the ground surface at a point adjacent to and spaced from the point on the ground surface previously engaged by a cleat 82 of the roller 34 when the vehicle 20 travels in the forward direction over the ground surface. Also, each cleat 84 of the roller 54 engages the ground surface in criss-cross relation with respect to the points on the ground surface contacted by the cleats 82 and 86 of the rollers 34 and 56.

The spacing of the cleats 82 of the roller 34 relative to the cleats 86 of the roller 56 is accomplished by providing positive drive means operatively connecting the roller 34 to the roller 56. This means includes a drive chain 100 (Figure 4) traveling over a sprocket wheel 102 fixed to the roller 56 and over another sprocket wheel 104 on the drive shaft 74. Another sprocket wheel 106 on the drive shaft 74 is connected by a drive chain 108 to a sprocket wheel 110 on an idler shaft 112 supported on the frame 22. The output shaft 114 of the engine 32 is connected by sprocket wheels 116 and 118 and a chain 120 to the idler shaft 112. A rotatable shaft 122 supported on the platform 28 adjacent the forward end of the latter has a sprocket wheel on one end, as at 124, connected by a chain 126 to yet another sprocket wheel 128 mounted on the idler shaft 112.

As shown in Figures 8 and 9, the shaft 122 is connected by a chain 130, a sprocket wheel 132, a stub shaft 134, universal joints 136 and 138, a shaft 140 connecting the universal joints 136 and 138 together, and a drive chain 142 traveling over other sprocket wheels 144 and 146, to the roller 34. The sprocket wheel 144 is fixedly secured to the roller 34 and the sprocket wheel 146 is carried upon a projecting end portion of the adjacent universal joint 138.

In Figures 4 and 7, the numeral 148 designates a hydraulic pump by means of which hydraulic cylinder assemblies 150 and 152 are actuated in opposite movement directions in order to steer the front roller 34.

A fluid pump 154 is driven by the engine 32 and has an inlet 156 connected to the interior of the tank 78. The outlet 158 (Figure 15) of the pump 154 is connected in communication with a hose 160 having a spray nozzle 162 on the free end thereof, as shown in Figure 3. A pressure relief valve 164 bleeds back to the tank 78 fluid from the hose 160 when the nozzle 162 is in closed condition or when the pressure is in excess of that required by the nozzle 162.

A hose 166 connects the pump inlet 156 with the interior of the tank 78 adjacent the bottom of the latter. A pair of strainer assemblies 168 are mounted over the top of the tank 78 under covers 170 and are employed to strain the chemical ingredients introduced into the tank 78 for the purpose of forming a vegetation-killing solution. A paddle assembly 172 (Figure 5) is rotatably mounted in the bottom portion of the tank 78 and is connected by suitable drive means, as at 174 to the drive shaft 74.

Referring to Figures 10 to 12, inclusive, the hydraulic cylinder assemblies 150 and 152 are seen operatively connected to a fluid control valve 176 of conventional design and which is in circuit with the pump 148 on the engine 32. In Figure 10 the hydraulic cylinder assemblies 150 and 152 are in a condition for executing a right turn of the vehicle 20, in Figure 11 they are in the condition for executing a left turn, and in Figure 12 the control valve 176 is shown in neutral position. Such a control system is of conventional design and need not be further detailed here for reasons of simplicity.

A winch 180 having a cable 182 wound thereon is mounted on the platform 28 adjacent the engine 32 and is connectible to the engine 32 by means of a clutch 184. The end portion of the cable 182 is threaded through a sleeve 186 (Figure 18) and is supported between rollers 188 for playing out from the winch 180. A hook 190 is carried on the free end of the cable 182 and is employed to fasten the cable 182 to a fixed object when it is desired to pull the vehicle 20 over obstacles or into and out of canal areas in which the vehicle 20 is not able to propel itself by the drive means connecting the engine 32 to the three rollers 34, 54 and 56.

In Figures 13 and 14 is shown a means by which the roller 34 may be adjusted relative to the legs 42 and 44 of the frame 40 for the purpose of applying to the drive chain 142 the proper tension. This means consists in a block 192 supporting the adjacent end 45 of the fixed shaft or axle 46, the block 192 being slidable in a slideway 194 provided in the free end portion of the legs 42. It is to be understood that the other end of the axle 46 is similarly supported in the legs 44. The block 192 is adjustably positioned in the slideway 194 by means of an adjusting bolt 196. The shafts 58 and 60 of the rollers 54 and 56 are similarly supported in the legs of the members 66 and 68.

In operation, the vehicle 20 is employed to travel along the bottom of a drainage canal and to crush, by the cleats 82, 84 and 86, the vegetation growing in the canal and clogging the free flow of water therethrough. The feature of the cleats on the rollers being arranged so that they do not follow in the track of one another is for the purpose of cutting as fine as possible and crushing into as small lengths as possible the vegetation stems and leaves so that the crushed and broken vegetation particles may be floated away by means of the hose and fluid pressure, washed from the canal bed, and simultaneously treated with a chemical solution inhibiting further growth or killing the vegetation outright. The hose and spray nozzle 162 is also employed for spraying areas of the banks of the canal so as to kill the vegetation thereon and to prevent the same from growing back into the canal and clogging the free flow of drainage water therethrough.

The winch 180 and cable 182 form a convenient means by which the vehicle 20 can pull itself out of a canal or swamp area not otherwise negotiable by means of the driven rollers 34, 54 and 56.

The positive drive means for the rollers 34 and 56 includes positive drive means for the roller 54, this including a suitable sprocket wheel (not shown) on the drive shaft 74 connected by a drive chain 196 to a sprocket wheel 198 on the end of the roller 54, as shown in Figure 1. Adjustment of the positioning of the cleats on the roller 34 relative to the cleats on the rollers 58 and 56 is made by loosening the respective drive chains and shifting the rollers on the chain.

What is claimed is:

1. In a work vehicle for use in a drainage canal, a frame having a forward end and a rearward end, a steerable first ground-engaging roller arranged transversely of said frame adjacent the forward end thereof and supporting the forward end of said frame, and a second and a third ground-engaging roller arranged in tandem spaced relation positioned transversely of said frame adjacent the rearward end and supporting the rearward end of said frame, each of said rollers being provided with a plurality of continuous projecting cleats extending in transverse spaced relation across the exterior surface from one end to the other end thereof, the cleats of said first and third rollers running in the same direction with the cleats of said second roller running in the opposite direction.

2. In a work vehicle for use in a drainage canal, a frame having a forward end and a rearward end, a steerable first ground-engaging roller arranged transversely of said frame adjacent the forward end thereof and supporting the forward end of said frame, and a second and a third ground-engaging roller arranged in tandem spaced relation positioned transversely of said frame adjacent the rearward end and supporting the rearward end of said frame, each of said rollers being provided with a plurality of continuous projecting cleats extending in transverse spaced relation across the exterior surface from one end to the other end thereof, each of said cleats embodying a pair of legs arranged in diverging relation with the convergent ends merging into an apex, the cleats of said first and third rollers being arranged so that the apexes of the respective cleats lie along a circle circumscribed about the central points of said rollers with the legs running in the same direction, the cleats of said second roller being arranged so that the apexes of the respective cleats lie along a circle circumscribed about the central point thereof with the legs running in the opposite direction.

3. In a work vehicle for use in a drainage canal, a frame having a forward end and a rearward end, a steerable first ground-engaging roller arranged transversely of said frame adjacent the forward end thereof and supporting the forward end of said frame, and a second and a third ground-engaging roller arranged in tandem spaced relation positioned transversely of said frame adjacent the rearward end and supporting the rearward end of said frame, each of said rollers being provided with a plurality of continuous projecting cleats extending in transverse spaced relation across the exterior surface from one end to the other end thereof, each of said cleats embodying a pair of legs arranged in diverging relation with the convergent ends merging into an apex, the cleats of said first and third rollers being arranged so that the apexes of the respective cleats lie along a circle circumscribed about the central points of said rollers with the legs running in the same direction, the cleats of said second roller being arranged so that the apexes of the respective cleats lie along a circle circumscribed about the central point thereof with the legs running in the opposite direction, the cleats of said third roller being arranged relative to the cleats of said first roller so that each cleat of said third roller engages the ground surface at a point adjacent to and spaced from the point on the ground surface engaged by a cleat of said first roller when said vehicle travels in the forward direction over the ground surface.

4. In a work vehicle for use in a drainage canal, a frame having a forward end and a rearward end, a steerable first ground-engaging roller arranged transversely of said frame adjacent the forward end thereof and supporting the forward end of said frame, a second and a third ground-engaging roller arranged in tandem spaced relation positioned transversely of said frame adjacent the rearward end and supporting the rearward end of said frame, each of said rollers being provided with a plurality of continuous projecting cleats extending in transverse spaced relation across the exterior surface from one end to the other end thereof, each of said cleats embodying a pair of legs arranged in diverging relation with the convergent ends merging into an apex, the cleats of said first and third rollers being arranged so that the apexes of the respective cleats lie along a circle circumscribed about the central points of said rollers with the legs running in the same direction, the cleats of said second roller being arranged so that the apexes of the respective cleats lie along a circle circumscribed about the central point thereof with the legs running in the opposite direction, the cleats of said third roller being arranged relative to the cleats of said first roller so that each cleat of said third roller engages the ground surface at a point adjacent to and spaced from the point on the ground surface engaged by a cleat of said first roller when said vehicle travels in the forward direction over the ground surface, and positive drive means operatively connecting said first and third rollers together.

5. In a work vehicle for use in a drainage canal, a frame having a forward end and a rearward end, a steerable first ground-engaging roller arranged transversely of said frame adjacent the forward end thereof and supporting the forward end of said frame, a second and a third ground-engaging roller arranged in tandem spaced relation positioned transversely of said frame adjacent the rearward end and connected to said frame for rocking movement as a unit about a common transverse horizontal axis, each of said rollers being provided with a plurality of continuous projecting cleats extending in transverse spaced relation across the exterior surface from one end to the other end thereof, each of said cleats embodying a pair of legs arranged in diverging relation with the convergent ends merging into an apex, the cleats of said first and third rollers being arranged so that the apexes of the respective cleats lie along a circle circumscribed about the central points of said rollers with the legs running in the same direction, the cleats of said second roller being arranged so that the apexes of the respective cleats lie along a circle circumscribed about the central point thereof with the legs running in the opposite direction, the cleats of said third roller being arranged relative to the cleats of said first roller so that each cleat of said third roller engages the ground surface at a point adjacent to and spaced from the point on the ground surface engaged by a cleat of said first roller when said vehicle travels in the forward direction over the ground surface, and positive drive means operatively connecting said first, second and third rollers together.

References Cited in the file of this patent

UNITED STATES PATENTS

| | | |
|---|---|---|
| 876,951 | Dollison | Jan. 21, 1908 |
| 1,230,194 | Mattson | June 19, 1917 |
| 1,294,791 | Grady | Feb. 18, 1919 |
| 2,319,255 | Norton | May 18, 1943 |
| 2,352,301 | Welles | June 27, 1944 |